US007941483B2

(12) United States Patent
Kumar Narayanan et al.

(10) Patent No.: US 7,941,483 B2
(45) Date of Patent: May 10, 2011

(54) LOW LATENCY DISPLAY METHODS FOR THIN CLIENT DEVICES

(75) Inventors: Ajit Kumar Narayanan, Bangalore (IN); Uma Kant Singh, Bangalore (IN)

(73) Assignee: SAP AG, Walldorf (DE)

( * ) Notice: Subject to any disclaimer, the term of this patent is extended or adjusted under 35 U.S.C. 154(b) by 1052 days.

(21) Appl. No.: 11/692,649

(22) Filed: Mar. 28, 2007

(65) Prior Publication Data
US 2008/0244427 A1 Oct. 2, 2008

(51) Int. Cl.
*G06F 15/16* (2006.01)

(52) U.S. Cl. ...................................................... 709/203

(58) Field of Classification Search .................... 709/203
See application file for complete search history.

(56) References Cited

U.S. PATENT DOCUMENTS

| 4,529,839 A * | 7/1985 | Colton et al. ............ 375/240.12 |
| 5,995,518 A * | 11/1999 | Burns et al. .................... 370/503 |
| 6,356,899 B1 * | 3/2002 | Chakrabarti et al. ......... 707/737 |
| 6,874,126 B1 * | 3/2005 | Lapidous ...................... 715/711 |
| 6,950,857 B1 * | 9/2005 | Arnold .......................... 709/217 |
| 6,963,353 B1 * | 11/2005 | Firestone .................... 348/14.09 |
| 2003/0131126 A1 * | 7/2003 | Cheung et al. ................ 709/238 |
| 2004/0128702 A1 * | 7/2004 | Kaneko ......................... 725/137 |
| 2004/0162078 A1 * | 8/2004 | Ramaswamy et al. ........ 455/445 |
| 2004/0205830 A1 * | 10/2004 | Kaneko .......................... 725/135 |
| 2004/0246976 A1 * | 12/2004 | Balakrishnan et al. .. 370/395.41 |
| 2005/0135476 A1 * | 6/2005 | Gentric et al. ............. 375/240.1 |
| 2006/0132607 A1 * | 6/2006 | Kimber et al. ............. 348/207.1 |
| 2008/0205394 A1 * | 8/2008 | Deshpande et al. .......... 370/390 |

FOREIGN PATENT DOCUMENTS
JP 2005168004 A * 6/2005
* cited by examiner

*Primary Examiner* — Jeffrey Pwu
*Assistant Examiner* — Saad A Waqas
(74) *Attorney, Agent, or Firm* — Kenyon & Kenyon LLP

(57) ABSTRACT

Control techniques support low latency display operations on thin client devices. In response to a request to render a page in a user interface, the control may distinguish fields that likely have immediately displayable content from fields that are unlikely to have immediately displayable content. The control may retrieve data for those fields that are likely to have immediately displayable content and render them in an initial page. Content for the fields that are unlikely to have immediately displayable content may be generated as a background process and may be rendered in supplemental page(s) as they become available. The control permits quick rendering of basic pages, which may include navigation functionality, and therefore promote early navigation operations or quick review of data which can be made immediately available.

29 Claims, 4 Drawing Sheets

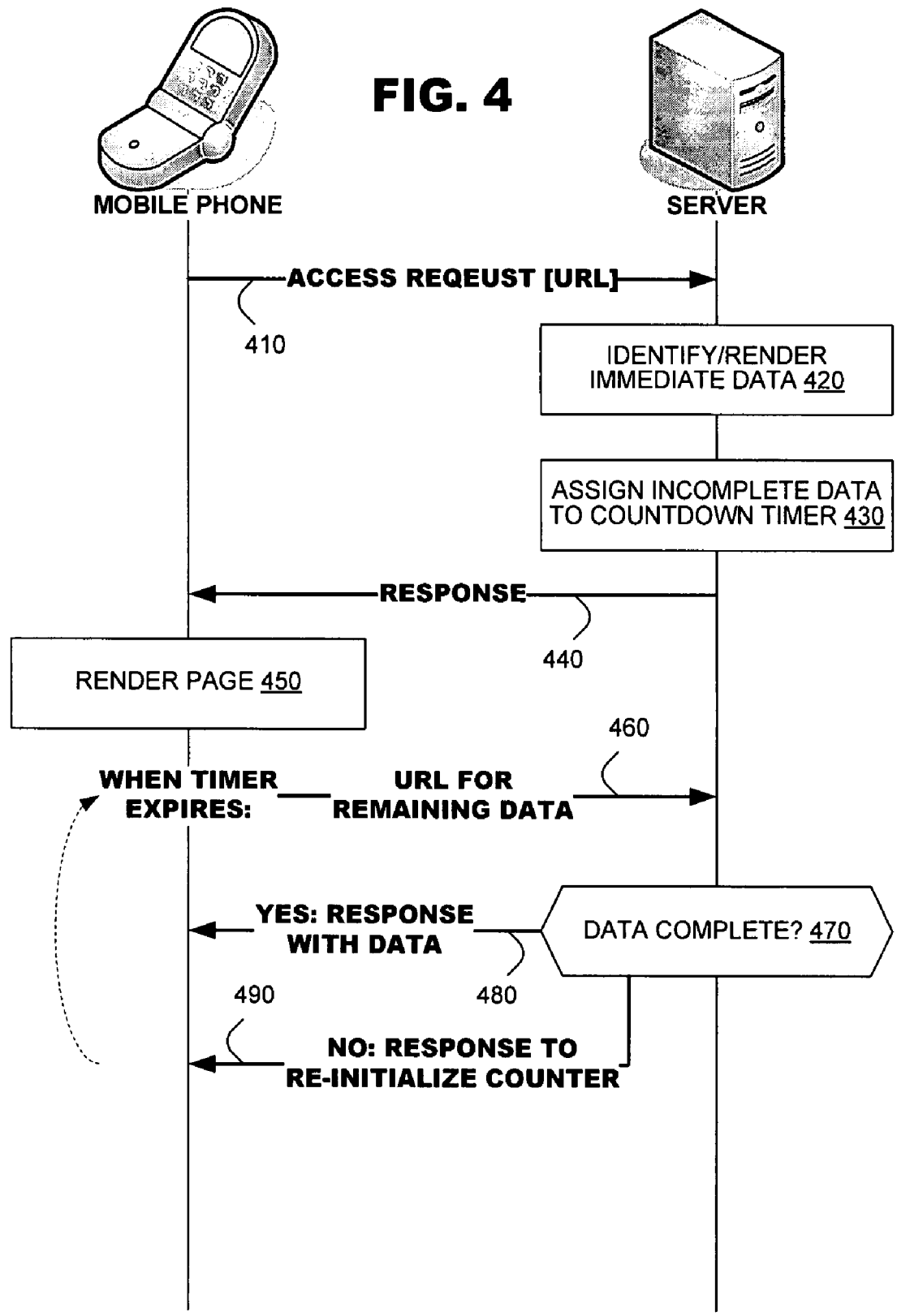

200 # LOW LATENCY DISPLAY METHODS FOR THIN CLIENT DEVICES

BACKGROUND

Embodiments of the present invention relate to page rendering operation in thin client devices.

Thin client devices typically are computing devices that possess less processing resources than a conventional server, desktop computer or even laptop computer. Although the thin client device may possess similar architectures as more robust computing devices in that it may contain a microprocessor, random access memory and non-volatile storage device(s), these components may be less robust than their desktop counterparts. For example, the microprocessors of thin clients may execute at lower speeds than their desktop counterparts and the memories may store less data. Thin client devices often are battery-powered to make them mobile but their batteries may not possess sufficient battery life to permit powerful computing operation to be run constantly for hours as may be done with conventional laptop computers. As a result, applications that execute quickly on a desktop may execute far too slow on the thin clients to be effective.

User interface designs for thin client devices, however, often mimic those of more robust devices. Regular operators of personal digital assistants (PDAs) may have observed that it often can take perhaps ¼ to ½ of a second to erase a first page of data and display a second page of data even when the PDA presents data that is immediately available in local storage. When the thin client device is required to perform numerical computation before presenting a page of information, latencies between the time that page is requested and the time that a page is displayable can vary between 2-15 seconds. Operators of thin client devices often work regularly with their robust computing counterparts and consider these latencies quite irritating. However, because the thin client devices have limited storage and battery life, it often is impractical to pre-compute such data and cache it for later use.

Accordingly, there is a need in the art for a user interface control technique that provides a low latency display of page-based data even when numeric computation becomes required. Further, there is a need in the art for such a control technique that is compatible with the reduced processing power, storage capabilities and battery life that normally are found in thin client devices.

BRIEF DESCRIPTION OF THE DRAWINGS

FIG. 4 is a communication flow diagram according to an embodiment of the present invention.

DETAILED DESCRIPTION

Embodiments of the present invention provide techniques that support low latency display operations on thin client devices. In response to a request to render a page in a user interface, the embodiments may distinguish fields that likely have immediately displayable content from fields that are unlikely to have immediately displayable content. The embodiments may retrieve data for those fields that are likely to have immediately displayable content and render them in an initial page. Content for the fields that are unlikely to have immediately displayable content may be generated as a background process and may be rendered in supplemental page(s) as they become available. These embodiments permit quick rendering of basic pages, which may include control functionality, and therefore promote early navigation operations or quick review of data which can be made immediately available.

Figure 1:
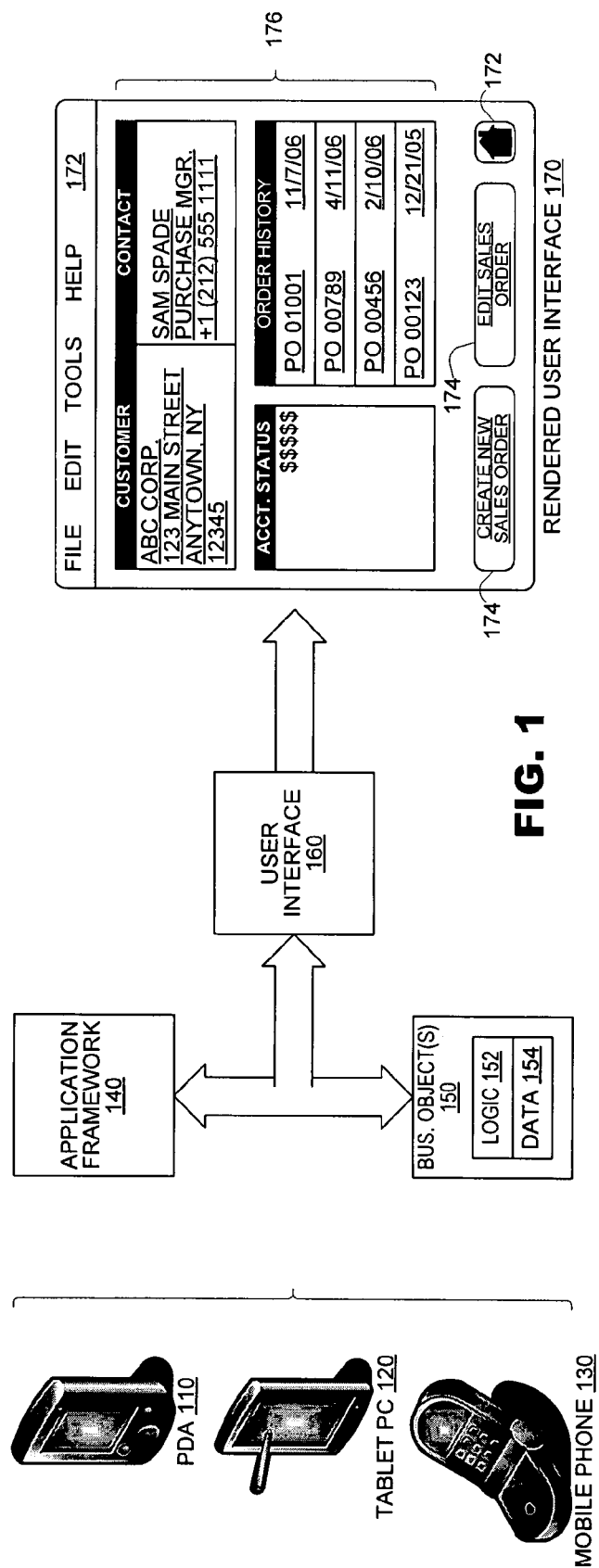
FIG. 1 illustrates exemplary thin client devices, an exemplary software architecture therefore and an exemplary rendered page which may be used on such devices.

FIG. 1 illustrates exemplary thin clients 110-130. As noted, the thin client is a computing device that possesses less processing resources than a conventional server, desktop computer or even laptop computer. At the time of this writing, common thin client devices include without limitation PDAs 110, tablet PCs 120 and mobile phones 130.

FIG. 1 also illustrates a simplified software architecture that may be used in a thin client. The thin client may execute an application framework 140, which provide computer services that assist operators of the thin client to perform their jobs such as create purchase orders, develop quotes and the like. The thin clients may store business objects 150, data elements that store data representing the purchase orders, quotes or other work product generated by the operators. The business objects 150 may contain data 152 representing the work product of the operator. The business objects 150 also may contain business logic 154, which may define behavior of the business object within the application framework 140. For example, a business object that represents a purchase order may have different behavior than a business object that represents a quote. Some of the behavioral aspects of these different types of business objects may be defined in the business object itself—the logic 154. Additionally, the thin client may possess a user interface 160, which renders information in a display of the client as dictated by the application framework 140, including information of the business object (s) 150.

During operation of the thin client device, an operator typically navigates among and selects desired application features, which are rendered by the client device via the user interface 160. In so doing, the operator may invoke features of the application framework 140 and operational constraints of the business object 150. The operator also may create new business objects.

FIG. 1 further illustrates an example of a rendered display 170 that may be supported by the user interface. As illustrated, the rendered display includes controls 172 that are contributed by the application framework 140. The rendered display may include other controls 174 that are contributed by the business object logic 154. And, of course, the display 170 illustrates content 176 contributions from the business object data 152. In this regard, the operation of a thin client device is well known.

Figure 2:
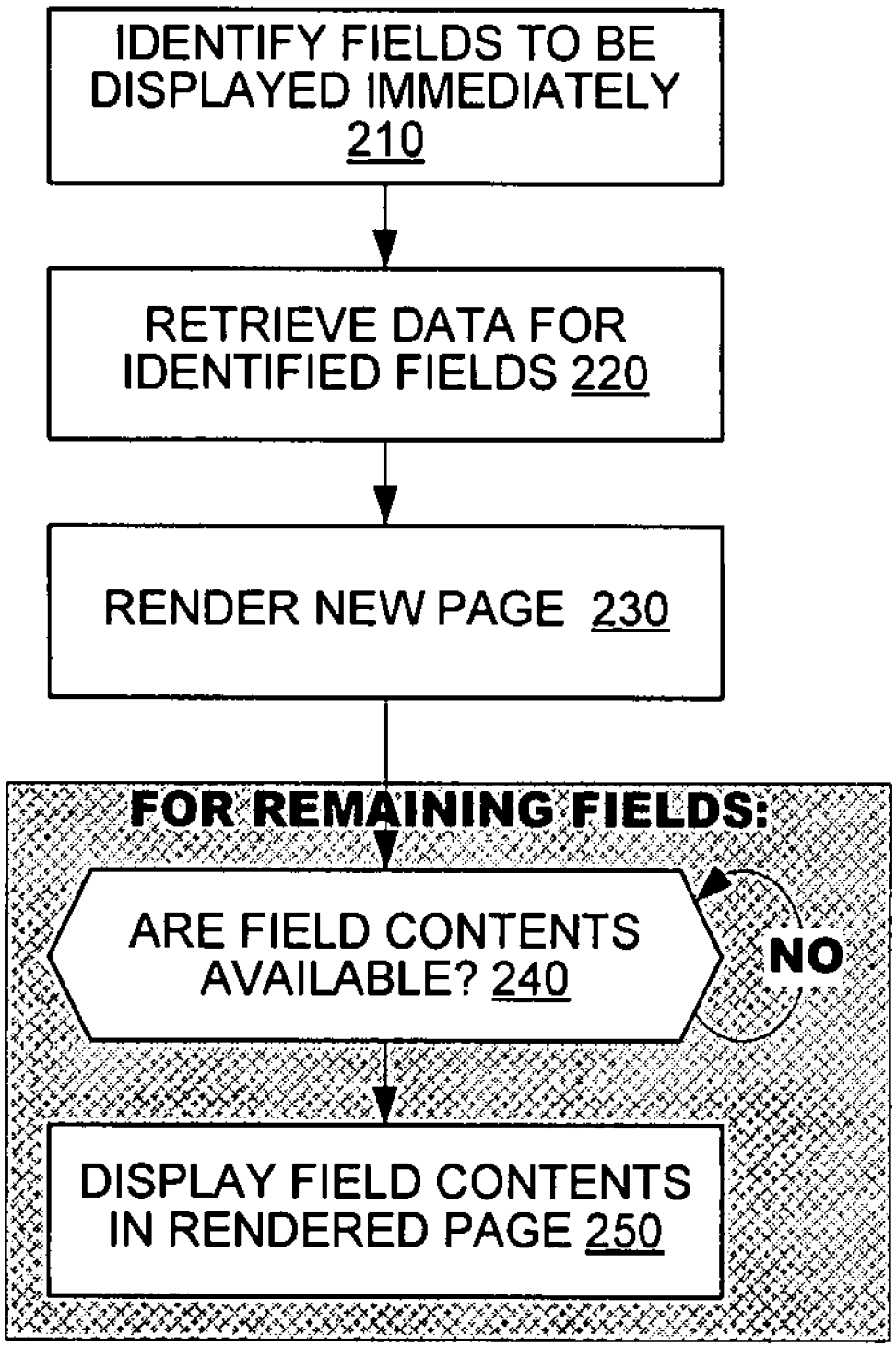
FIG. 2 is a method diagram according to an embodiment of the present invention.

Embodiments of the present invention introduce a user interface management scheme for thin client devices that stagger presentation of fields of a rendered display. FIG. 2 is a flow diagram of a method 200 according to an embodiment of the present invention, which may be invoked when a new display is to be rendered on a thin client device. According to the method, the user interface may survey fields to identify fields that are immediately displayable and those that are displayable after some latency (box 210). Immediately displayable fields may include control elements from the application framework and/or business logic and also may include fields that contain data content that may be read directly from a stored business object (for example, customer contact information). Other fields to be displayed may require computation from among several elements of business object data and might not be available for display immediately. The method then may retrieve data for the immediately available display fields (box 220) and render a new display using the retrieved data (box 230). Background processing of other fields for the displayable page may continue and responsive data may become available thereafter.

The method periodically may continue to survey data of the not-yet-displayed fields to determine whether responsive data has become available (box 240) and may supplement the rendered display as it becomes available (box 250). Even before the rendered display is fully supplemented, interactive controls of the display may be fully functional, which permits the operator to navigate away from the page as desired. The display method of the foregoing embodiments can be particularly advantageous when an operator merely needs to read readily available information from a page (such as customer contract information) or when the operator reached the rendered page merely in an effort to navigate past it to reach some other rendered page that was the operator's intended destination.

In an embodiment, designers of user interfaces may mark fields as either immediately displayable or not as part of their definitions of individual rendered pages. In such an embodiment, the user interface components of thin clients may review the markings in page definitions to determine which fields to display immediately and which to defer. Alternatively, the identification of immediately displayable/not-immediately displayable fields may be determined by interpolation of data calls made from business object data. Calls that are direct reads of business object data may be considered immediately displayable. Calls that involve computation from two or more elements of business object data may be considered not immediately displayable.

Figure 3:
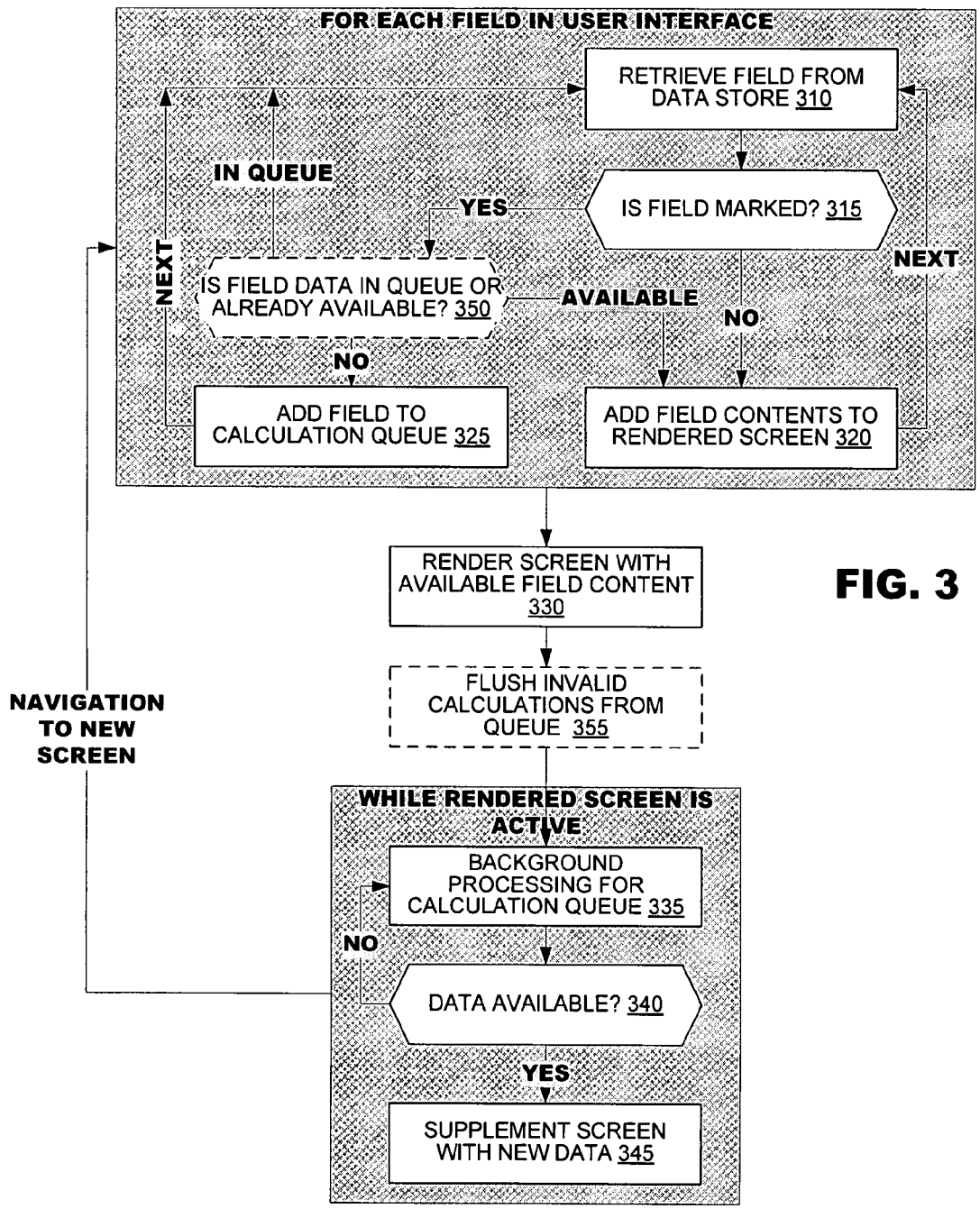
FIG. 3 is a method diagram according to another embodiment of the present invention.

FIG. 3 illustrates a method 300 according to another embodiment of the present invention. In this embodiment, when a new page is to be rendered on a thin client display, the method 300 may survey each field to be displayed on the page and retrieve a field definition from storage (box 310). The method may determine whether the field is marked as having high-latency content (box 315) and, if not, schedule the field contents to be included in a first rendering of the page to be displayed (box 320). If so, however, the field may be added to a calculation queue (box 325) explained further below. After all fields in the page to be rendered have been considered pursuant to boxes 310-325, the method may retrieve data of the non-marked fields and render the page with available content (box 330).

While the rendered page is active, the thin client device may perform background processing of data calculations or other operations of marked field data as specified in its calculation queue (box 335). As data becomes available for individual page fields (box 340), the thin client may supplement the rendered page to include the new data (box 345). Background processing may continue until it completes or until an operator enters a navigation command which causes the user interface to navigate to another page.

In some implementations, separate pages may share common field content. For example, in a customer relationship management (CRM) application, multiple pages may include aggregate computations of a customer's pending orders, outstanding invoices or purchasing trends. According to an embodiment of the present invention, when an operator navigates from a first page to a second page and the method determines at box 315 that a particular field is marked, the method further may determine if data of the marked field is already in queue or already available (box 350). If the data is already available, perhaps by being calculated for use in the immediately preceding page, the field may be scheduled for immediate display in box 320. If the data is already in queue, the method may advance to box 310. Otherwise, the method may advance to box 325 as previously described.

In an embodiment, after all fields have been considered in boxes 310-325 and 350, the method may flush the calculation queue of all fields that are not related to a present page being rendered (box 355). Thus, carryover calculations that were relevant to a preceding page but are no longer relevant to a current page being displayed may be terminated.

FIG. 4 is a communication flow diagram illustrating communication between a terminal and server according to an embodiment of the present invention. There, the method may begin when a terminal issues an access request 410 to the server, typically by issuing a uniform resource locator that addresses the server. In response, the server identifies immediately-available data and generates a responsive page therefrom (420). The server also may initiate a countdown timer (430). The server may transmit a response 440 to the terminal, containing the responsive page. The terminal renders the page (450) and manages operation of the countdown timer.

When the timer expires, the thin client may issue a second request 460 to the server to obtain the remaining data. The server may determine whether other responsive data is available (470) and, if so, it generates a new page populated by the immediately-available data and the newly-calculated data. If not, the server may generate a response 490 that causes the thin client to re-initialize the countdown timer. To simplify operation at the thin client, the response 490 may (but need not) include a duplicate copy of the most recently delivered page. The thin client may repeat its management of the timer and requests for supplementary information until all data becomes available or until the user navigates away from the rendered page.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A low latency display method to render a page in an user interface on a thin client device, comprising:
    requesting a page definition record of the page that includes low-latency fields and high-latency fields, wherein low-latency and high-latency refer to computational latency;
    receiving data for the low-latency fields and a first delay timer value;
    creating an initial rendering of the page with the data of the low-latency fields;
    displaying the initial rendering;
    initiating a timer with the first delay timer value;
    after the timer expires, requesting a supplemental response;
    receiving data for the high-latency fields or a second delay timer value;
    responsive to receiving the second delay timer value, waiting for the timer to expire with the second delay timer value; and
    responsive to receiving data for the high-latency fields, supplementing the initial rendering with the data of the high-latency fields.

2. The method of claim 1, wherein the fields in the page definition record include identifiers to identify the fields as either low-latency fields or high-latency fields.

3. The method of claim 1, further comprising:
designating a first processing queue for the low-latency fields and a second processing queue for the high-latency fields;
for each field on the page:
determining whether the field is a low-latency field or a high-latency field; and
if the field is a low-latency field, placing the field in the first processing queue;
otherwise, placing the field in the second processing queue.

4. The method of claim 1, wherein the initial rendering includes navigation items that, when triggered, cause the user interface to navigate to a new page.

5. The method of claim 1, wherein generating data occurs concurrently with creating the initial rendering.

6. The method of claim 1, further comprising:
generating data for the high-latency fields; and
terminating the generating process if the initial rendering ceases to be displayed.

7. The method of claim 1, wherein supplementing the initial rendering comprises: rendering a supplemental page with the data of the low-latency fields and the data of the high-latency fields; and replacing the initial rendering with the supplemental page.

8. The method of claim 1, wherein supplementing the initial rendering occurs on a periodic basis.

9. The method of claim 1, wherein supplementing the initial rendering occurs as the data for each high-latency field becomes available.

10. The method of claim 1, further comprises, for each high-latency field:
determining if data for the high-latency field is readily available due to a previously rendered page;
if so, processing the high-latency field as a low-latency field.

11. The method of claim 1, further comprises, for each high-latency field of the page:
determining if a previously queued high-latency field, identical to the high-latency field, is being generated; and
if so, preventing the high-latency field from being generated.

12. The method of claim 11, wherein the previously queued field is a part of a previously rendered page.

13. A server-side low latency display method to render a page in a user interface on a thin client device, comprising:
in response to an initial request from the thin client device for a page:
separating fields in a page definition record of the page into low-latency fields and high-latency fields, wherein low-latency and high-latency refer to computational latency;
retrieving data for the low-latency fields;
creating an initial rendering of the page with the data of the low-latency fields;
transmitting the initial rendering and a first delay timer value to the thin client device;
adding the high-latency fields to a computation queue;
generating data for the high-latency fields according to the queue;
purging the computation queue of any fields unrelated to the page; and
in response to a supplemental request from the thin client device:
if the high-latency fields are ready, transmitting the data of the high-latency fields to the thin client device, else transmitting a second delay timer value.

14. The method of claim 13, wherein transmitting the data comprises:
determining if new data has become available since last transmission; and
if so, transmitting the new data to the thin client device;
otherwise, transmitting a response to the thin client device asking the thin client device to delay for a period of time before making the supplemental request again.

15. The method of claim 13, wherein transmitting the data comprises:
rendering a supplemental page with the data of the low-latency fields and the data of the high-latency fields; and
transmitting the supplemental page to the thin client device.

16. A client-side low latency display method to render a page requested from a server on a thin client device, comprising:
making an initial request for the page to the server;
in response to a first delay timer value and a first batch of low-computational-latency data received from the server, creating an initial rendering of the page with the first batch of data;
displaying the initial rendering;
initiating a timer with the first delay timer value;
after waiting a first delay timer value, making a first supplemental request to the server;
in response, receiving a second batch of data if ready, else receiving a second delay timer value;
in response to a second delay timer value received from the server, waiting a duration of the second delay timer value before making a second supplemental request to the server; and
supplementing the initial rendering with the second batch of data, wherein the second batch of data required computation of stored data while the first batch of data was directly accessed.

17. The method of claim 16, wherein the first batch of data comprises a countdown timer to be maintained by the thin client device, and upon the expiration of the countdown timer, the thin client device may then make the supplemental request to the server.

18. The method of claim 16, wherein the second batch of data comprises only field data not included in the first batch of data, and supplementing the initial rendering comprises:
rendering a supplemental page with data from the first and the second batches; and
replacing the initial rendering with the supplemental page.

19. The method of claim 16, wherein the second batch of data comprises field data not included in the first batch of data and a repeat of field data already received with the first batch of data, and supplementing the initial rendering comprises:
rendering a supplemental page with the second batch of data; and
replacing the initial rendering with the supplemental page.

20. A system adapted to render a page in an user interface on a thin client device, comprising:
a processing unit;
a storage system having a first and a second storage locations; and
a displaying unit;
wherein the processing unit is adapted to render the page by:
separating fields in a page definition record of the page into low-latency fields having readily accessible stored data values and high-latency fields requiring more substantial computation to produce data values, wherein low-latency and high-latency refer to computational latency;

retrieving data for the low-latency fields from the first storage location;

creating an initial rendering of the page with the data of the low-latency fields;

displaying the initial rendering on the displaying unit;

generating data for the high-latency fields based on data from the second storage location;

subsequent to a first delay time: receiving the generated data if available, else setting a second delay time; and supplementing the initial rendering with the data of the high-latency fields on the displaying unit.

21. A system adapted to render a page in an user interface on a thin client device, comprising:

a processing unit;

a first and a second connected storages; and a networking unit;

wherein the processing unit is adapted to render the page requested by the thin client device connected via the networking unit by:

separating fields in a page definition record of the page into low-latency fields and high-latency fields, wherein low-latency and high-latency refer to computational latency;

retrieving data for the low-latency fields from the first connected storage;

creating an initial rendering of the page with the data of the low-latency fields;

transmitting the initial rendering and a first delay timer value to the thin client device via the networking unit, wherein the thin client device is configured to wait the first delay timer value duration before sending a first supplemental request;

generating data for the high-latency fields based on data from the second connected storage; and in response to a first supplemental request from the thin client device, transmitting the data of the high-latency fields to the thin client device via the networking unit if ready, else transmitting a second delay timer value, wherein the thin client device is configured to wait the second delay timer value duration before sending a second supplemental request.

22. The system of claim 21, wherein the first and the second connected storages are on a same storage device.

23. The system of claim 21, wherein at least one member selected from the group consisting of the first and the second connected storages comprises a plurality of databases.

24. The system of claim 21, wherein at least one member selected from the group consisting of the first and the second connected storages is on a local storage device.

25. The system of claim 21, wherein at least one member selected from the group consisting of the first and the second connected storages is on a remote storage device.

26. A system adapted to render a page requested from a server in an user interface on a thin client device, comprising:

a processing unit;

a displaying unit; and a networking unit;

wherein the processing unit is adapted to render the page from the server connected via the networking unit by:

making an initial request for the page to the server via the networking unit;

in response to a first batch of data received from the server, creating an initial rendering of the page with the first batch of data;

displaying the initial rendering on the displaying unit;

if the initial rendering is incomplete:

waiting a first delay timer value;

making a supplemental request to the server via the networking unit;

in response to a second delay timer value, waiting the second delay timer value before making another supplemental request; and in response to a second batch of data received from the server, supplementing the initial rendering with the second batch of data, wherein the second batch of data has a greater computational latency than the first batch of data.

27. A computer readable non-transitory storage medium having program instructions stored thereon that, when executed, causes a computer system to:

separate fields in a page definition record of a page to be displayed into low-latency fields and high-latency fields, wherein low-latency and high-latency refer to computational latency;

retrieve data for the low-latency fields;

create an initial rendering of the page with the data of the low-latency fields;

display the initial rendering;

generate data for the high-latency fields;

wait a first delay timer value; and subsequently, wait a second delay timer value if the data for the high-latency fields is not generated, else supplement the initial rendering with the data of the high-latency fields.

28. The method of claim 13, wherein low-latency fields include data ready to be read from a storage medium, and wherein high-latency fields include computations that require multiple data-sets and a computed result.

29. The method of claim 13, wherein the low-latency fields and the high-latency fields are transmitted on the same transmission link.

* * * * *